INVENTOR
FRED A. GREENAWALT

BY
Olsen and Stephenson
ATTORNEYS

INVENTOR
FRED A. GREENAWALT
BY
Olsen and Stephenson
ATTORNEYS

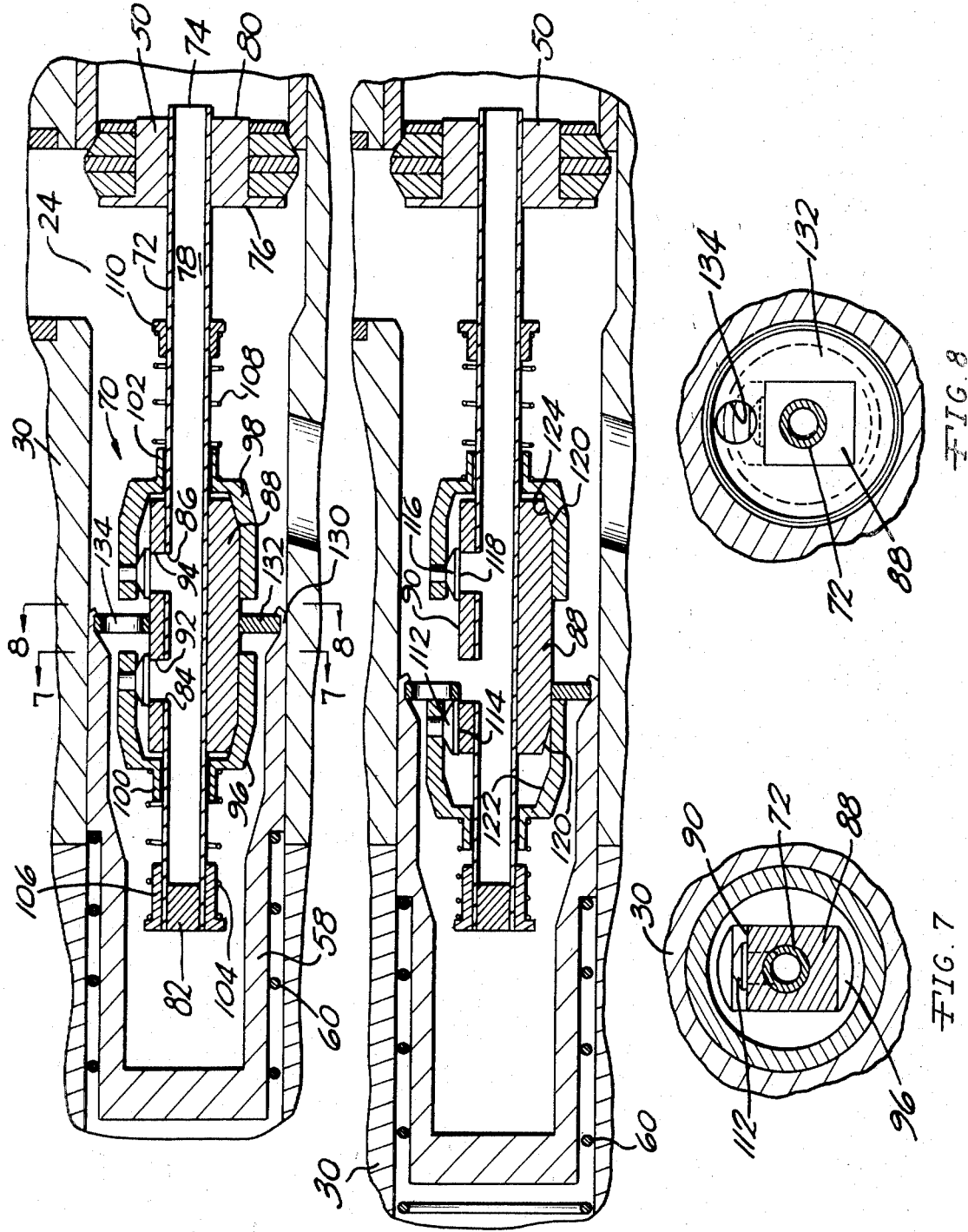

Sept. 8, 1970        F. A. GREENAWALT        3,527,255

REVERSING VALVE

Filed Nov. 4, 1968        4 Sheets-Sheet 4

INVENTOR
FRED A. GREENAWALT

BY *Olsen and Stephenson*

ATTORNEYS

United States Patent Office 3,527,255
Patented Sept. 8, 1970

3,527,255
REVERSING VALVE
Fred A. Greenawalt, 4913 NE. 12th Ave.,
Fort Lauderdale, Fla. 33308
Filed Nov. 4, 1968, Ser. No. 773,223
Int. Cl. E03b
U.S. Cl. 137—625.29            10 Claims

ABSTRACT OF THE DISCLOSURE

A reversing valve for refrigeration and air conditioning systems operable to selectively reverse the order of flow of refrigerant through the condenser and the evaporator, a solenoid actuated main valve being movable between two seated positions to effect reversal. A valve element assembly is associated with the main valve member so that in response to initial movement of the valve actuating mechanism, the valve element assembly operates to substantially equalize the fluid pressures on opposite sides of the main valve member to thereby enable reliable valve actuation with a small force.

---

The reversing valve of this invention is an improvement on the reversing valve shown in applicant's prior Pat. 3,293,880. It is an object of this invention to provide an improved reversing valve in which the flow of refrigerant can be reversed by a solenoid actuated valve which is easily actuated because it provides in each instance for substantial equalization of the fluid pressures on opposite sides of the valve member which must be moved to effect reversal.

In the reversing valve of this invention, a valve element assembly is associated with the actuating shaft for the main valve member so that when the solenoid assembly is initially actuated, the high pressure fluid on one side of the main valve member is dumped to the low side. This enables movement of the main valve member with a force which would otherwise be of insufficient magnitude to overcome the high pressure on one side of the valve. The valve element assembly includes poppet-type valve elements and supporting spring biased frames therefor which insure prompt movement of the valve elements between open and closed positions.

Further objects, features and advantages of this invention will become apparent from a consideration of the following description, the appended claims, and the accompanying drawing in which:

FIG. 3 is an enlarged fragmentary view of a portion of the reversing valve of this invention showing the main valve member in a position corresponding to its position shown in FIG. 1;

FIG. 4 is a fragmentary sectional view like FIG. 3 showing the valve element assembly in an initially moved position immediately following solenoid energization and preparatory to movement of the main valve member from its position shown in FIG. 3;

Figure 5:
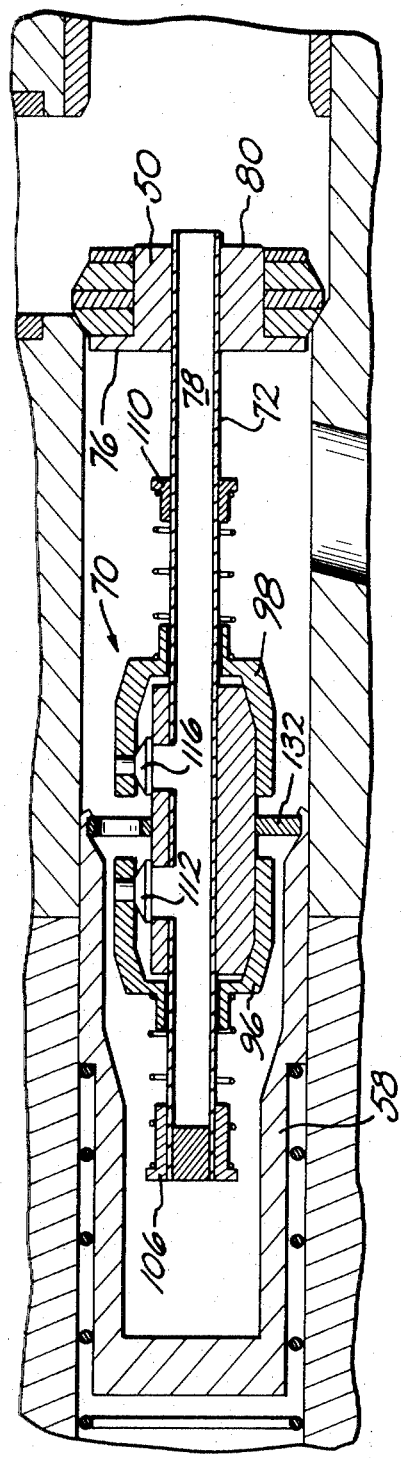
FIG. 5 is a fragmentary view, like FIGS. 3 and 4, showing the main valve member moved from its position shown in FIG. 3 to its position illustrated in FIG. 2.
Figure 6:
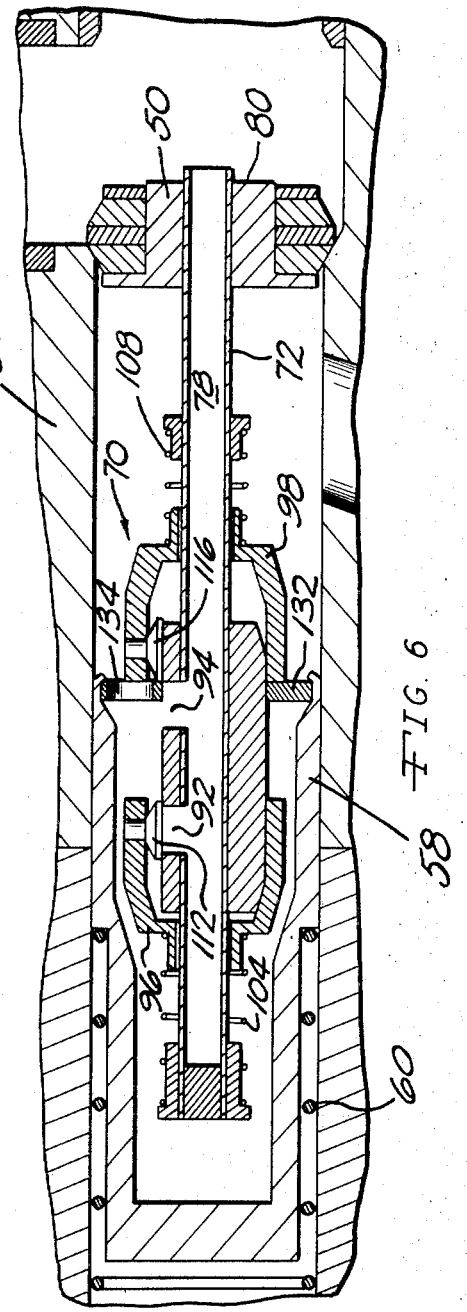

FIG. 6 is a fragmentary sectional view like FIGS. 3, 4 and 5 showing the valve element assembly immediately following de-energization of the solenoid; and FIG. 7 and 8 are fragmentary sectional views of portions of the reversing valve of this invention as seen from substantially the lines 7—7 and 8—8 respectively in FIG. 3.

Figure 1:
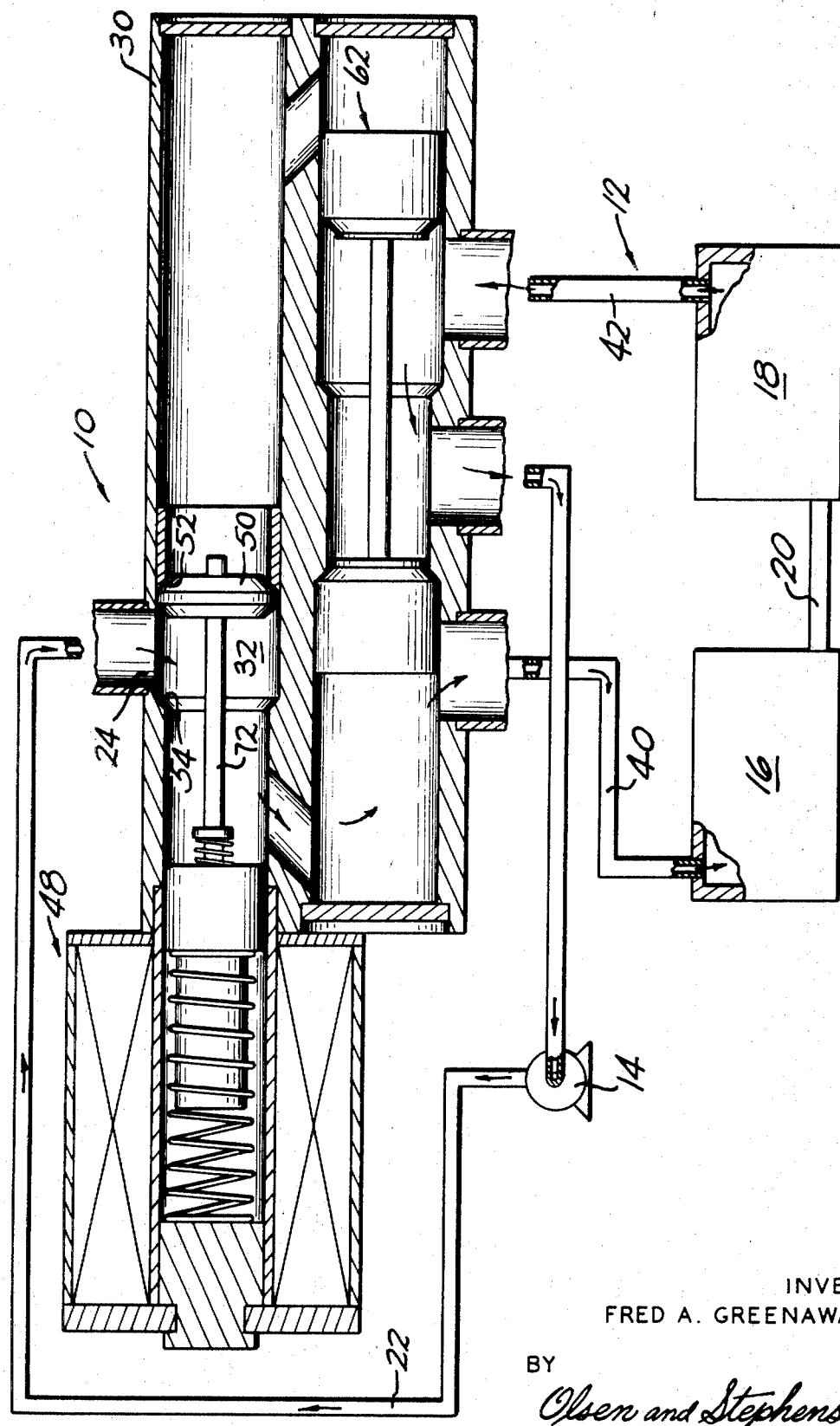
FIG. 1 is a schematic illustration of a refrigeration system showing the reversing valve of this invention assembled in the system and in a position in which it provides for flow of refrigerant in one direction through the heat exchangers in the system, with the reversing valve and certain parts of the system being shown in section for the purpose of clarity.

With reference to the drawing, the improved reversing valve of this invention, indicated generally at 10, is illustrated in FIG. 1 in a refrigeration system 12 which includes a conventional compressor 14 and heat exchangers 16 and 18. A conventional flow restriction tube 20 connects the heat exchangers 16 and 18, both of which are capable of functioning either as a condenser or as an evaporator. The compressor has its discharge connected by a conduit 22 to an inlet port 24 for the reversing valve 10. A conduit 26 connects an outlet port 28 for the reversing valve 10 with the suction inlet of the compressor 14.

In the illustrated embodiment of the invention, the valve 10 consists of a valve body 30 formed with a pair of valve chambers 32 and 34. A pair of ports 36 and 38 are formed in the body 30 so that they communicate with the chamber 34 on opposite sides of the outlet port 28. The port 36 is connected by a conduit 40 to the heat exchanger 16 and the port 38 is connected by a conduit 42 to the heat exchanger 18. The chamber 32 communicates with the chamber 34 through internal passages 44 and 46 formed in the valve body 30.

Figure 2:
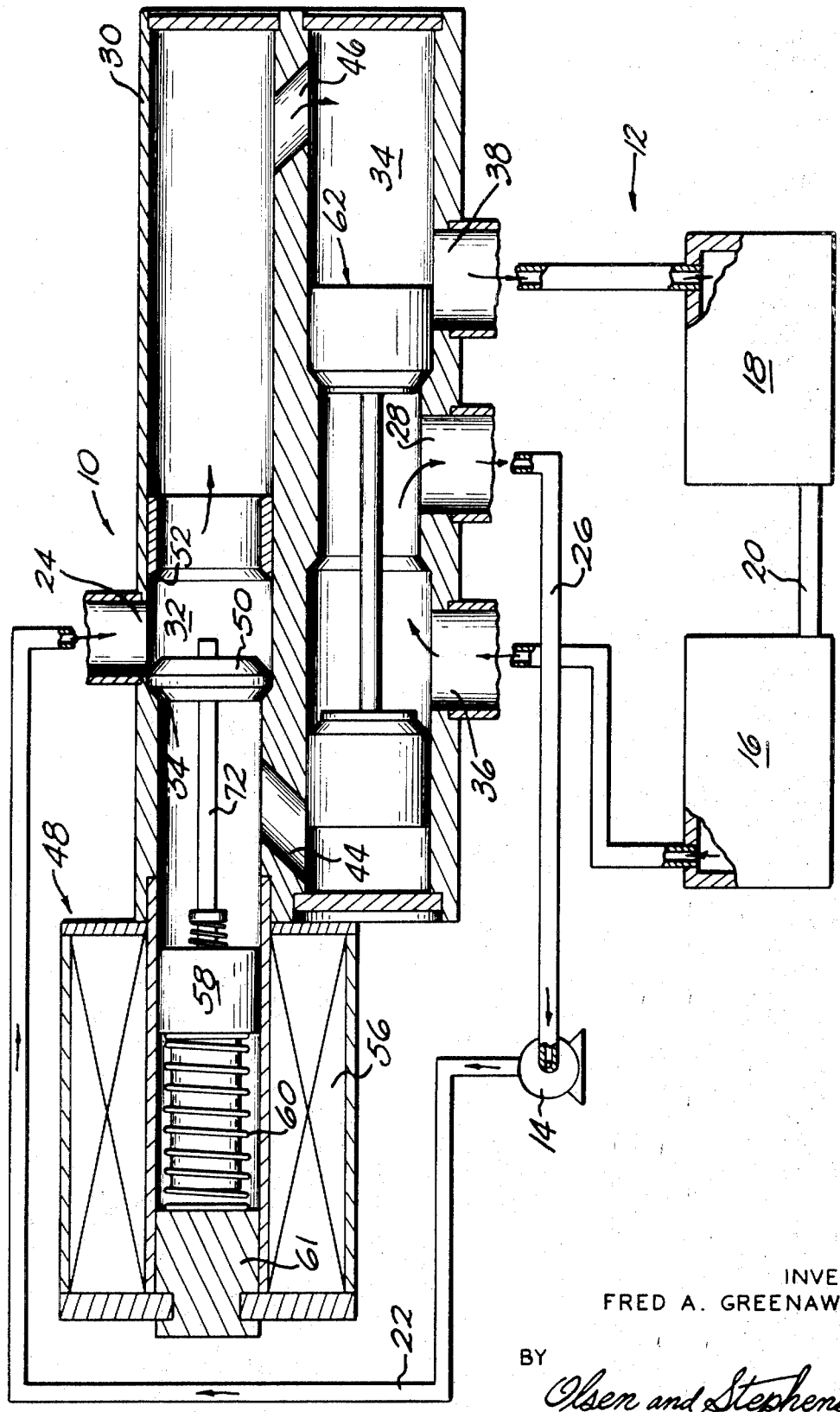
FIG. 2 is a schematic illustration like FIG. 1 showing the reversing valve of this invention in a position for reversing the flow of refrigerant through the heat exchangers in the system.

A solenoid assembly 48 is mounted on one end of the valve body 30 for moving a main valve member 50 in the chamber 32 between positions engaged with a pair of seats 52 and 54 disposed on opposite sides of the inlet port 24. The solenoid assembly 48 includes a solenoid coil 56 which surrounds a generally tubular armature 58 and a spring 60 which extends between an abutment 61 and the armature 58 for urging the armature 58 in a direction toward the right as viewed in FIGS. 1 and 2. The coil 56 is connected in a suitable circuit such that when the circuit is open, and the coil 56 is de-energized, the spring 60 will move the armature 58 so as to move the valve member 50 into engagement with the seat 52. When the circuit is closed so as to energize the coil 56, the armature 58 is pulled to the left as viewed in FIG. 1 so as to move the valve member 50 into engagement with the seat 54, as illustrated in FIG. 2. Thus, with the valve member 50 engaged with the seat 52, as shown in FIG. 1, fluid under pressure entering the valve body 30 through the inlet port 24 will flow through the chamber 32 and the passage 44 into the chamber 34. When the valve member 50 is shifted to a seated position on the seat 54, fluid under pressure entering the valve body 30 through the inlet port 24 will flow through the chamber 32 and the passage 46 into the chamber 34, as shown in FIG. 2. A free floating piston assembly 62 is slidably supported in the chamber 34 for movement between the positions illustrated in FIGS. 1 and 2 in response to the above-described movement of the main valve member 50 so as to reverse the direction of flow through the heat exchangers 16 and 18, as described in greater detail in the aforementioned patent.

It can thus be seen that in the seated positions of the main valve member 50 illustrated in FIGS. 1 and 2, high pressure fluid is present on only one side of the main valve member 50, while there may be some leakage of this fluid around the valve member 50, this leakage must be kept to a minimum in order to avoid undesirable movement of the free floating piston assembly 62. As a result, in shifting the main valve member 50 between its seats 52 and 54, the force of high pressure fluid resisting such movement must, in the absence of other provisions, be overcome, thereby necessitating, in most instances, a solenoid assembly 48 of a size and strength undesirably large. In the improved reversing valve of this invention, a valve element assembly, indicated generally at 70 in FIG. 3, is provided for equalizing the pressures on opposite sides of the valve member 50 in response to initial actuation of the solenoid assembly 48 for shifting the valve member 50.

The valve assembly 70 is mounted on a tubular shaft 72 which is secured to and extends through the valve member 50 and is provided with an open end 74. As shown in FIG. 3, the shaft 72 extends from one side 76 of the valve member 50 and, by virtue of its tubular construction, is provided with an internal passage 78 which communicates with the opposite side 80 of the valve member 58 through the open end 74 of the shaft 72. The opposite end of the shaft 72 is closed by a plug 82, and intermediate its ends the shaft 72 is provided with a pair of openings 84 and 86 for a purpose to appear presently.

A generally rectangular block member 88 is secured to the shaft 72 and is provided on one side with a substantially flat face 90. Openings 92 and 94 in the block member 88 extend through the face 90 and are aligned with the openings 84 and 86, respectively, in the tubular shaft 72. A pair of frames 96 and 98 have tubular bearing portions 100 and 102, respectively, which are loosely supported on the shaft 72 for sliding movement therealong. A spring 104 extends between a sleeve 106 affixed on the shaft 72 and the frame 96 so as to urge the frame 96 toward the right as viewed in FIG. 3. A similar spring 108 extends between a sleeve 110 affixed on the shaft 72 and the frame 98 so as to urge the frame 98 toward the left as viewed in FIG. 3. The frame 96 carries a poppet-type valve member 112 having a flat face 114 which slides on the block member face 90. The frame 98 carries a similar poppet-type valve member 116 having a flat face 118 which slides on the block member face 90. As shown in FIGS. 3 and 5, the springs 104 and 108 urge the frames 96 and 98, respectively, toward positions in which the valve members 112 and 116 close the valve openings 92 and 94.

The tight engagement of the valve member faces 114 and 118 with the block member surface 90 is improved by coacting cam surfaces on the block member 88 and the frames 96 and 98. As shown in FIGS. 3 and 5, the block member 88 is formed at its ends with inclined cam surfaces 120 which are engaged by similarly inclined cam surfaces 122 and 124 on the frames 96 and 98, respectively, in response to urging of the springs 104 and 108. As a result, when the cam surfaces 120 and 122 engage, the frame 96 is urged downwardly, as viewed in FIG. 3, to move the valve element surface 114 tightly against the block member surface 90. Similarly, when the block member cam surface 120 engages the cam surface 124 on the frame 98, the valve element surface 118 is urged tightly against the block member surface 90. This tight engagement is made possible by the loose mounting of the frame bearing portions 100 and 102 on the shaft 72.

The armature 58 extends about the shaft 72 at a position radially outwardly of the valve element assembly 70, and at its open end 130, the armature 58 carries an abutment member 132 formed with an opening 134 and shaped to slide longitudinally on the block member 88. As a result, when the armature 58 is moved to the left, from its position shown in FIG. 3, the abutment member 132 will engage the frame 96 and move the frame 96 toward the left against the action of the spring 104. Similarly, when the armature 58 is moved toward the right, from its position shown in FIG. 5, the abutment member 132 will engage the frame 98 and move it toward the right against the pressure of the spring 108.

OPERATION

In the operation of the reversing valve 10, assume that the solenoid coil 56 is de-energized and that the main valve member 50 is in its position shown in FIGS. 1 and 3. Now assume that the coil 56 is energized to thereby move the armature 58 toward the left as viewed in FIGS. 1 and 3. As the armature 58 commences its movement toward the left, the abutment 132 engages the frame 96, as shown in FIG. 4, and moves the frame 96 to a position in which the valve member 112 is to one side of the valve opening 92. During such movement, the force applied to the shaft 72 by the spring 104 is insufficient to move the valve member 50 off its seat 52 against the high pressure of fluid on the side 76 of the valve member 50. However, as soon as the valve element 112 is moved to its position shown in FIG. 4, high pressure fluid on the side 76 of the valve member 50 can flow through the passage 78 in the shaft 72 to the opposite side 80 of the valve member 50. Thus, the fluid pressures on opposite sides of the valve member 50 tend to be equalized so that the spring 104, which is now compressed, and the armature 58 can readily pull the valve member 50 off its seat 52 and onto its seat 54, following which the spring 104 immediately returns the valve element 112 to its position closing the valve opening 92, as shown in FIG. 5. It can thus be seen that the valve element assembly 70 provides for easy and quick movement of the valve member 50 from its position on the seat 52 to a position on the seat 54, with a minimum size solenoid assembly 48 being required since the pressure of fluid at the inlet port 24 does not have to be overcome during such valve movement.

With the valve element assembly 70 in the position shown in FIG. 5, in which position the valve member 50 is seated on the valve seat 54, when the solenoid coil 56 is de-energized the spring 60 immediately moves the armature 58 toward the right, as viewed in FIG. 5, to the position illustrated in FIG. 6. In this position of the armature 58, the abutment 132 has engaged the frame 98 and has moved the valve element 116 to a position to one side of the valve opening 94. High pressure fluid from the inlet port 24, which is now being applied against the side 80 of the main valve member 50 can now flow through the passage 78 in the valve shaft 72, through the valve opening 94 and the opening 134 in the abutment 132 to the side 76 of the valve member 50. Thus, the fluid pressures on opposite sides of the valve member 50 now tend to be equalized so that the compressed spring 108 and the armature spring 60 can readily push the valve member 50 off its seat 54 and onto its seat 52, thereby returning the valve member 50 to its position shown in FIG. 3. In this position, the spring 108 provides for a return of the valve element 116 to its closed position.

From the above description it is seen that this invention provides an improved reversing valve which is readily operable to shift the main valve member 50 between its seats 52 and 54 by virtue of the inclusion of the valve element assembly 70 which functions to provide for substantial equalizing of the fluid pressures on opposite sides of the main valve member 50 whenever it is to be shifted between its seats 52 and 54. The particular poppet valves 112 and 116 employed in the assembly 70 are operable over a prolonged service life to provide for closing of the valve openings 92 and 94 when desired and to provide for quick movement to one side of these openings when shifting of the main valve member 50 is desired.

It will be understood that the reversing valve which is herein disclosed and described is presented for purposes of explanation and illustration and is not intended to indicate limits of the invention, the scope of which is defined by the following claims.

What is claimed is:

1. A reversing valve for a reversible cycle refrigerant system comprising:
    (a) a valve body having a chamber and an inlet port communicating with said chamber and adapted to be connected to a source of fluid under pressure,
    (b) means in said chamber forming valve seats on opposite sides of said inlet port,
    (c) a valve member positioned between said seats and movable alternately into engagement with each of said seats, (d) an actuating shaft connected to said valve member and extending from one side thereof, passage means in said shaft communicating with the opposite side of said valve member, (e) valve means in said shaft intermediate the ends thereof communicating with said passage means and operable when open to provide for flow of fluid from the high pressure side to the low pressure side of said valve member, and (f) means for moving said shaft so as to move said valve member from one seat to the other providing for initial opening of said valve means so as to tend to equalize the pressures on opposite sides of said valve member and reduce the force necessary to move said valve member.

2. A reversing valve according to claim 1 wherein said means for moving said shaft includes an armature arranged adjacent said shaft and movable between two positions corresponding to positions of said valve member engaged with said seats and means operatively associated with said armature and responsive in operation to initial movement of said armature from either of said two positions to open said valve means.

3. A reversing valve according to claim 2 wherein said armature is substantially tubular and extends about said shaft.

4. A reversing valve acording to claim 3 further including a selectively energizable coil surrounding said armature.

5. A reversing valve according to claim 2 wherein said valve means includes a pair of valve elements mounted for sliding movement relative to said shaft and means forming openings in said shaft located so that said valve elements are movable to positions closing said openings.

6. A reversing valve according to claim 5 further including frame means supporting each of said valve elements, spring means on said shaft urging said frame means to position said valve elements in positions closing said shaft openings, and means on said armature engageable with said frame means and operable on movement of said armature to move said frame means against the urging of said spring means.

7. A reversing valve according to claim 5 further including a pair of frames supporting said valve elements, spring means on said shaft urging each of said frames to a position in which the valve element thereon closes a shaft opening, and abutment means on said armature disposed between said frames and engageable with one of said frames on movement of said armature in one direction to move the valve element on said one frame out of a position closing an opening in said shaft.

8. A reversing valve according to claim 7 further including coacting cam means on said frames and said shaft urging said valve elements toward said shaft in the positions of said valve elements closing said openings.

9. A reversing valve according to claim 7 further including a block member affixed on said shaft and having a substantially flat face with openings therein aligned with said shaft openings, said valve elements having flat faces positioned in sliding engagement with said flat face on said block member.

10. A reversing valve according to claim 9 further including coacting cam surfaces on said frames and said block member, said spring means urging said cam surfaces into engagement, said cam surfaces being operable when engaged to urge said flat valve element faces against said flat block member face.

References Cited

UNITED STATES PATENTS

| | | |
|---|---|---|
| 1,315,387 | 9/1919 | Murphy. |
| 3,076,630 | 2/1963 | Hammond. |

ARNOLD ROSENTHAL, Primary Examiner

U.S. Cl. X.R.

137—630.15